(12) United States Patent  (10) Patent No.: US 7,521,892 B2
Funabashi et al.  (45) Date of Patent: Apr. 21, 2009

(54) CORDLESS POWER TOOL WITH OVERCURRENT PROTECTION CIRCUIT PERMITTING THE OVERCURRENT CONDITION DURING SPECIFIED TIME PERIODS

(75) Inventors: Kazuhiko Funabashi, Hitachinaka (JP); Takao Aradachi, Hitachinaka (JP); Hiroyuki Hanawa, Hitachinaka (JP); Masayuki Ogura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 389 days.

(21) Appl. No.: 11/396,682

(22) Filed: Apr. 4, 2006

(65) Prior Publication Data

US 2006/0220605 A1 Oct. 5, 2006

(30) Foreign Application Priority Data

Apr. 4, 2005 (JP) ............................ P2005-107208

(51) Int. Cl.
*H01M 10/46* (2006.01)
(52) U.S. Cl. ...................................... 320/114
(58) Field of Classification Search ................. 320/107, 320/114, 115, 134, 136
See application file for complete search history.

(56) References Cited

U.S. PATENT DOCUMENTS

| 4,217,400 | A | | 8/1980 | Leffingwell |
| 5,883,480 | A | * | 3/1999 | Domel et al. ................ 318/282 |
| 6,160,375 | A | * | 12/2000 | Horie et al. .................. 320/116 |
| 6,177,209 | B1 | | 1/2001 | Okutoh |
| 6,331,764 | B1 | | 12/2001 | Oglesbee |
| 2003/0096158 | A1 | | 5/2003 | Takano et al. |

FOREIGN PATENT DOCUMENTS

| GB | 1 594 121 | 7/1981 |
| JP | 11-0555866 | 2/1999 |
| JP | 2000-012107 | 1/2000 |
| JP | 2002-223525 | 8/2002 |
| JP | 2003-164066 | 6/2003 |
| JP | 2003-340749 | 12/2003 |
| RU | 2 248 656 | 6/2004 |
| SU | 636740 | 12/1978 |

* cited by examiner

*Primary Examiner*—Edward Tso
(74) *Attorney, Agent, or Firm*—Antonelli, Terry, Stout & Kraus, LLP.

(57) ABSTRACT

A cordless power tool uses a lithium battery as a power source of a motor and is provided with an overcurrent protection circuit. The circuit allows an overcurrent to instantaneously flow at the start-up time of the motor and shuts off an overcurrent which may flow when the motor is brought into a locked state during the use of the power tool.

17 Claims, 4 Drawing Sheets

CORDLESS POWER TOOL WITH OVERCURRENT PROTECTION CIRCUIT PERMITTING THE OVERCURRENT CONDITION DURING SPECIFIED TIME PERIODS

BACKGROUND OF THE INVENTION

1. Field of the Invention

The present invention relates to a cordless power tool using a lithium battery, and more particularly, to a cordless power tool having an overcurrent protection circuit to prevent an overcurrent from flowing in a lithium battery.

2. Description of the Related Art

In a power tool such as an electric screwdriver, an electric drill, an impact power tool, rotational power generated from an electric motor is applied to a speed reduction mechanism to reduce rotational speed and then transmitted to a bit attached to the distal end of the tool. Conventionally, the power tools are provided with a cord for connection to a commercial AC power source and the motor is rotated by the power supplied from the commercial AC power source. Recently, however, cordless power tools have been widely used, in which an alkaline secondary battery such as a nickel-cadmium battery or a nickel-hydrogen battery is used as a power source.

A power tool operating with a large voltage requires a large number of battery cells. The nominal voltage of a nickel-cadmium battery cell is 1.2 V, a power tool operating with 14.4 V has to be equipped with a battery pack housing therein twelve battery cells connected in series. A power tool operating with 24 V has to be equipped with a battery pack housing therein twenty battery cells connected in series. Accordingly, there is a problem such that the tool becomes heavier as the operating voltage of the tool is larger.

On the other hand, organic electrolyte secondary batteries such as a lithium battery and a lithium-ion battery are large in their nominal voltage. Accordingly, the number of battery cells can be reduced to obtain the same operating voltage, resulting in reduction of the weight and size of the power tool.

The lithium batteries include a vanadium lithium battery and a manganese lithium battery, and use a lithium aluminum alloy in the negative electrode and an organic electrolyte. The lithium-ion battery generally uses lithium cobalt oxide in the positive electrode, graphite in the negative electrode, and an organic electrolyte. In the following description, organic electrolyte secondary batteries including a lithium battery and a lithium-ion battery will be referred to simply as a lithium battery.

The nominal voltage of a lithium battery cell is as high as 3.6 V. Thus, a voltage with three nickel-cadmium battery cells can be obtained with a single lithium battery cell. When the lithium battery is used as the power source of a cordless power tool, the use of the lithium battery can significantly reduce the number of battery cells. On the other hand, the charge/discharge cycle life of the lithium battery is significantly shortened if the battery is overcharged or overdischarged, or an overcurrent flows in the lithium battery.

U.S. Patent Application Publication No. 2003096158 discloses an overdischarge prevention control in which a field-effect transistor interposed between a battery and a motor is rendered OFF to stop discharging when the battery voltage falls below a predetermined value.

While it is possible to further perform an overcurrent prevention control in a similar manner to the overdischarge prevention control described above, the following inconveniences are caused if the overcurrent prevention control is performed by switching OFF a field-effect transistor whenever the overcurrent flows in the battery.

As shown in FIG. 1, when a DC voltage is applied to a DC motor M from a DC power source B through a switching element S, a current Ia given by the following equation flows in the motor M and the switching element S immediately after the switching element S is closed, that is, at the time of start-up.

$$Ia=(V-E)/Ra$$

wherein V represents a voltage across the DC power source B; Ra, a resistance value of an armature winding of the DC motor M; and E, a counter electromotive force of the DC motor M.

At the time of start-up of the motor M, the counter electromotive force E is zero because the rotator of the motor M has not yet started rotating but is remained in a stationary state. For this reason, an overcurrent cannot be prevented from flowing in the motor M for a short time period. On the other hand, during use of a power tool such as an electric screwdriver or an electric power drill, the bit may bite into or seize a workpiece to be processed, with the result that the motor is temporarily brought into a locked state, that is, the motor stops its rotation.

FIG. 5 shows a current flowing in the armature winding of the motor M when the motor M comes into the locked state. In this case, since the counter electromotive force E of the motor M becomes zero, an overcurrent flows in the circuit including the switching element S and the motor M. If the overcurrent prevention control system is conFIGured to prevent an overcurrent from flowing in the circuit in all instances, the high level start-up current does not allow the motor M to start rotating. On the other hand, if the overcurrent prevention control system is conFIGured so that the high level start-up current is allowed to flow in the circuit, the DC power source cannot be protected from the overcurrent which may flow in the circuit during the use of the power tool. A lithium battery is unduly deteriorated by a high level current continuously flowing therein, causing the charge/discharge cycle life of the lithium battery to extremely shorten.

SUMMARY OF THE INVENTION

In view of the foregoing, it is an object of the present invention to provide a cordless power tool that can solve the above-mentioned problems.

Briefly, the present invention provides a cordless power tool wherein a lithium battery is used as a power source of a motor, and an overcurrent protection circuit is provided which allows an overcurrent to instantaneously flow in the motor when the motor starts rotating but does not allow the overcurrent to flow in the motor when the motor is brought in a locked state during the use of the power tool.

In order to attain the above and other objects, the present invention provides a power tool that includes a battery composed of a plurality of lithium battery cells connected in series; and a DC motor connected to the battery and supplied with a driving current from the battery, wherein an overcurrent defined by a current having a value equal to or greater than a predetermined value is prohibited to flow in the current path for more than a predetermined time period.

According to the invention, the lithium battery can be protected from an overcurrent flowing for a relatively long time period when the motor is locked, and the deterioration of the battery can be prevented.

The power tool may further include a switching element connected between the battery and the motor, a current detection section, and a controller. The battery, the switching element and the DC motor are connected to provide a current path and the DC motor is supplied with a driving current from the battery through the current path. The current detection section is provided for detecting a current flowing in the current path and outputting a detection signal indicative of the current flowing in the current path. The controller is provided for receiving the detection signal from the current detection section and controlling the switching element. The controller controls the switching element in such a manner that the controller shuts off a current flowing in the battery when the detection signal indicates that an overcurrent flows in the battery for a predetermined time period. Here, the overcurrent is defined by a current having a value equal to or more than a predetermined value.

Alternatively, the power tool may further include a switching element, a current detection section, and a microcomputer. The switching element is selectively rendered ON and OFF. The battery, the switching element and the DC motor are connected to provide a current path and the DC motor is supplied with a driving current from the battery through the current path. The current detection section is provided for detecting a current flowing in the current path and outputting a detection signal indicative of the current flowing in the current path. The microcomputer is provided for receiving the detection signal from the current detection section and controlling the switching element. The microcomputer has a control program that executes a first step wherein determination is made as to whether or not the value of a current flowing in the current path has exceeded a predetermined value, a second step wherein determination is made as to whether or not the current continuously flows in the current path for a first predetermined time period when the value of the current has exceeded the predetermined value, and a third step of generating a control signal to set the switching element in the off state when the current continuously flows in the current path for the first predetermined time period.

The control program of the microcomputer may further executes after execution of the third step, a fourth step wherein determination is made as to whether or not a second predetermined time period has expired after the switching element is set in the OFF state, and a control signal is generated to set the switching element in the ON state again when the second predetermined time period has expired.

The power tool includes a motor, a bit, a speed reduction mechanism, a main body, a handle, and a battery pack. The speed reduction mechanism has an input side operatively coupled to the motor and an output side operatively coupled to the bit. A rotational speed transmitted by the speed reduction mechanism to the bit is reduced relative to a rotational speed of the motor. The main body houses the DC motor and the speed reduction mechanism. The handle has one side coupled to the main body. The battery pack is attached to another side of the handle, and houses therein the battery.

In operation, when the current detection section detects a starting current of the DC motor, the switching element is set in the on state, whereas the switching element is set in the off state when the current detection section detects a lock current of the DC motor.

According to another aspect of the invention, there is provided a battery pack for use in a power tool including a motor. The battery pack includes a battery composed of a plurality of lithium battery cells connected in series; and a pair of connection terminals for connection to the power tool. An overcurrent, that is defined by a current having a value equal to or greater than a predetermined value, is prohibited to flow from the battery to the motor for more than a predetermined time period.

It is desirable that the battery pack further include a switching element, a current detection section and a controller. The current detection section is provided for detecting a current flowing from the battery to the motor and outputting a detection signal indicative of the current flowing from the battery to the motor. The controller is provided for receiving the detection signal from the current detection section and controlling the switching element. The controller controls the switching element in such a manner that the controller shuts off a current flowing from the battery when the detection signal indicates that an overcurrent flows in the battery for a predetermined time period. Here, the overcurrent is defined by a current having a value equal to or more than a predetermined value.

Alternatively, the battery pack may further include a switching element, a current detection section and a microcomputer. The switching element is selectively rendered ON and OFF, wherein in use, the DC motor is supplied with a driving current from the battery via the pair of connection terminals. The current detection section is provided for detecting a current flowing from the battery to the motor and outputting a detection signal indicative of the current flowing from the battery to the motor. The microcomputer is provided for receiving the detection signal from the current detection section and controlling the switching element. The microcomputer has a control program that executes a first step wherein determination is made as to whether or not the value of a current flowing in the current path has exceeded a predetermined value, a second step wherein determination is made as to whether or not the current continuously flows in the current path for a first predetermined time period when the value of the current has exceeded the predetermined value, and a third step of generating a control signal to set the switching element in the off state when the current continuously flows in the current path for the first predetermined time period.

The control program of the microcomputer may further execute after execution of the third step, a fourth step wherein determination is made as to whether or not a second predetermined time period has expired after the switching element is set in the OFF state, and a control signal is generated to set the switching element in the ON state again when the second predetermined time period has expired.

In operation, when the current detection section detects a starting current of the DC motor, the switching element is set in the on state, whereas the switching element is set in the off state when the current detection section detects a lock current of the DC motor.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE EMBODIMENTS

A power tool according to an embodiment of the present invention will be described while referring to the accompanying drawings.

Figure 1:
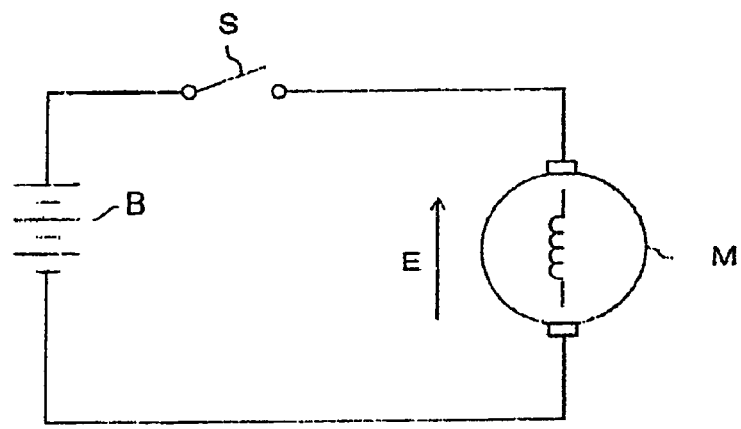
FIG. 1 shows a view to explain the operation of a DC motor.
Figure 2:
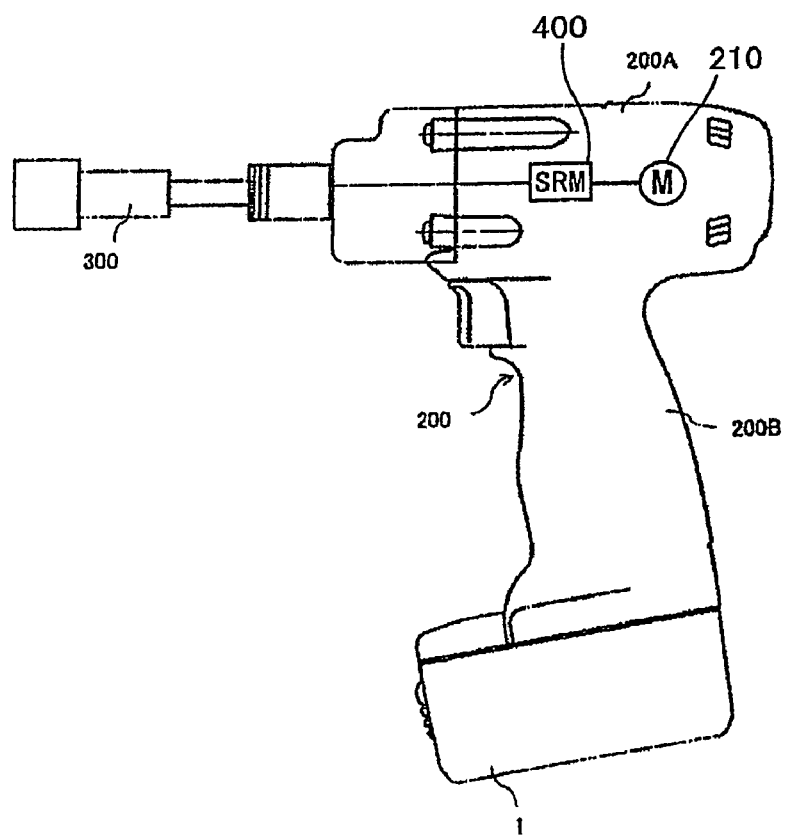
FIG. 2 shows a schematic view showing a power tool according to the present invention.

FIG. 2 shows a schematic view showing an illustrative example of a power tool. The power tool 200 shown therein is an electric screwdriver. Other power tools have a similar structure. The power tool 200 has a main body 200A, a handle 200B coupled to the main body 200A, and a battery pack 1 attached to the end portion of the handle 200B. The battery pack 1 houses a predetermined number of lithium battery cells connected in series.

The main body 200A includes a motor 210, a speed reduction mechanism 400, and a screwdriver bit 300 attached to the distal end of the main body 200A. The motor 210 rotates when connected to the battery housed in the battery pack 1. The speed reduction mechanism 400 is operatively coupled to the motor 210, reduces the rotational speed of the motor 210, and transmits the reduced rotational speed to the screwdriver bit 300 while substantially maintaining rotational motive energy generated from the motor 210. An impact power tool includes an impact mechanism (not shown), such as a hammer arranged between the speed reduction mechanism and the bit.

The nominal voltage of a lithium battery cell used in this illustrative example is 3.6 V. The power tool 200 is operated with 14.4 V, so that four lithium battery cells 11 through 14 (see FIG. 3) are connected in series.

A current from the lithium battery cells housed in the battery pack 1 flows in the motor 210 through a switching element. The switching element is switched ON when an overcurrent flows at the start-up time of the motor 210 whereas the switching element is switched OFF when an overcurrent flows in the motor 210 in the event that the motor 210 comes into the locked state, as will be described later.

Next, a specific example of an overcurrent protection circuit will be described.

Figure 3:
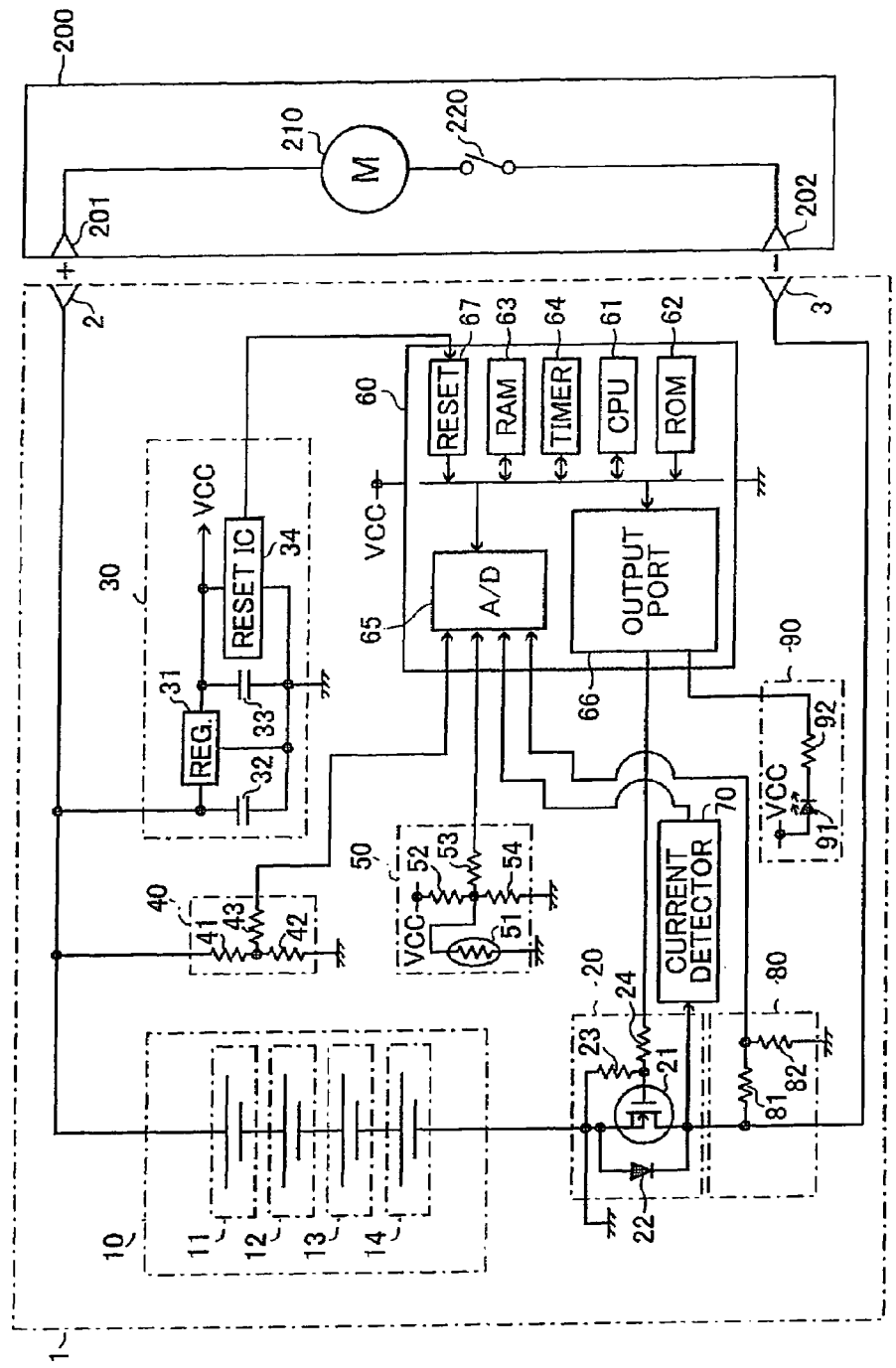
FIG. 3 is a circuit diagram showing a battery pack according to an embodiment of the present invention connected to a power tool.

FIG. 3 is a circuit diagram showing the battery pack 1 connected to a power tool 200. The battery pack 1 has a positive terminal 2 and a negative terminal 3. The positive terminal 2 is connected to a positive terminal 201 of the power tool 200 and the negative terminal 3 is connected to a negative terminal 202 of the power tool 200. The DC motor 210 and a power switch 220 are connected in series between the positive terminal 201 and the negative terminal 202 of the power tool 200.

The battery pack 1 includes a battery 10, a current switching section 20, a constant voltage power source 30, a battery voltage detector 40, a battery temperature detector 50, a microcomputer 60 which serves as a controller, a current detecting section 70, a trigger detector 80, and a display 90.

The battery 10 includes cells 11-14 that are connected in series by connection plates. The cells of the battery 10 are supposed to have the same capacity. However, in actuality the cells 11-14 have some variation in capacity.

When the switch 220 of the power tool 200 is turned on while the battery pack 1 is connected to the power tool 200, a discharge current flows from the positive terminal of the battery 10 through the power tool 200 to the negative terminal of the battery 10. The battery voltage detector 40, the constant voltage power source 30, the trigger detector 80, and the switching portion 20 are connected to the discharge current path, and the microcomputer 60 is connected to these and other components contained in the battery pack 1.

The microcomputer 60 includes a central processing unit (CPU) 61, a read-only memory (ROM) 62, a random access memory (RAM) 63, a timer 64, an analog-to-digital (A/D) converter 65, an output port 66, and a reset input port 67. The components of the microcomputer 60 are connected to each other through an internal bus.

The switching portion 20 is connected between the negative terminal of the battery 10 and the negative terminal 3 of the battery pack 1, and includes a field-effect transistor (FET) 21, and resistors 23, 24. A control signal from the output port 66 of the microcomputer 60 is applied to the gate of the FET 21 via the resistor 24 to perform switching control for the load current flowing through the power tool 200. A diode 22 connected across the source and drain of the FET 21 serves as a charge current path in which a charge current flows while the battery 10 is being charged with a battery charger (not shown) connected to the battery pack 1 in place of the power tool 200.

The current detecting section 70 serves to judge whether the battery 10 is being charged, discharging, or in other conditions, such as when no load is being placed on the battery. The input of the current detecting section 70 is connected to the cathode of the diode 22 and to the drain of the FET 21. The output of the current detecting section 70 is connected to the A/D converter 65 of the microcomputer 60.

Although not shown, the current detecting section 70 includes an inverting amplifier circuit and a non-inverting amplifier connected in parallel which selectively amplify the voltage applied to the current detecting section 70. The polarity of the voltage applied to the current detecting section 70 is determined depending on the direction of current, that is, whether a charge current flowing in the diode 22 or a discharge current flowing in the FET 21. The level of the voltage applied to the current detecting section 70 is determined depending on an ON resistance of the FET 21 and an ON voltage of the diode 22. As a result, an output is generated by either the inverting amplifier circuit or the non-inverting amplifier circuit depending on whether the battery 10 is being charged or discharged. The output from the current detecting section 70 is subject to A/D conversion by the A/D converter 65 of the microcomputer 60. If it is desired to accurately detect the current value during charge and discharge, then a low-resistance current detecting resistor can be disposed in the loop followed by the current. In this case, the voltage developed according to the level of the current flowing through the resistor can be amplified by an operational amplifier. The A/D converter 65 performs an A/D conversion on the output from the operation amplifier and the current value is calculated based on the resultant digital output.

The constant voltage power source 30 includes a three-terminal regulator (REG.) 31, smoothing capacitors 32, 33, and a reset IC 34. The constant voltage $V_{cc}$ output from the constant voltage power source 30 serves as the power source for the battery temperature detector 50, the microcomputer 60, the current detecting section 70, and the display 90. The reset IC 34 is connected to a reset input port 67 of the microcomputer 60 and outputs a reset signal to the reset input port 67 in order to initialize settings in the microcomputer 60.

The battery voltage detector 40 is provided for detecting a voltage of the battery 10 and includes resistors 41 to 43. The resistors 41, 42 are connected in series between the positive terminal of the battery 10 and ground. The A/D converter 65 of the microcomputer 60 is connected, through the resistor 43, to the connection point where the resistors 41, 42 are connected together, and outputs a digital value that corresponds to the detected battery voltage. The CPU 61 of the microcomputer 60 compares the digital value from the A/D converter 65 with first and second predetermined voltages to be described later. The first and second predetermined voltages are stored in the ROM 62 of the microcomputer 60.

The battery temperature detector 50 is located adjacent to the battery 10 to detect temperature of the battery 10. The temperature detected by the battery temperature detector 50 is not the temperature of the battery 10 in a strict sense but is substantially equal to the temperature of the battery 10. The battery temperature detector 50 includes a thermistor 51 and resistors 52 to 54. The thermistor 51 is connected to the A/D converter 65 of the microcomputer 60 through the resistor 53. Accordingly, the A/D converter 65 outputs a digital value that corresponds to the battery temperature detected by the battery temperature detector 50. The CPU 61 of the microcomputer 60 compares the digital value with a predetermined value to judge whether the battery temperature is abnormally high.

The trigger detector 80 includes resistors 81, 82 and detects when the switch 220 of the power tool 200 is turned ON. While the power switch 220 is OFF, the voltage of the battery 10 is not applied to the drain of the FET 21. Therefore, the input of the A/D converter 65 connected to the trigger detector 80 is held at ground potential. On the other hand, because the DC resistance of the DC motor 210 is extremely small, for example, only a few ohms, a voltage substantially the same as the battery voltage is developed between the drain and the source of the FET 21 while the switch 220 is ON. This voltage is divided at the resistors 81, 82 and the voltage developed across the resistor 82 is applied to the A/D converter 65 so that the ON condition of the switch 220 can be detected.

The display 90 includes a light emitting diode (LED) 91 and a resistor 92. The LED 91 is controlled to illuminate or turn OFF in accordance with output from the output port 66 of the microcomputer 60. The display 90 is controlled to display, for example, a warning that the temperature of the battery 10 is too high when the battery temperature detector 50 detects a battery temperature that is higher than the predetermined temperature.

Next, operation of the battery pack 1 will be described with reference to the circuit diagram of FIG. 3 and the flowchart of FIG. 4.

As described above, there are two kinds of overcurrents flowing in the battery 10. One is an overcurrent flowing at the start-up time of the motor 210, and the other is an overcurrent flowing when the motor comes into the locked state during the use of the power tool 200.

The overcurrent instantaneously flows at the start-up time of the motor 210 and the control sequence of the circuit allows this type of overcurrent to flow in the motor 210. On the other hand, the circuit is protected from the overcurrent flowing when the motor 210 comes into the locked state, which is typically caused by the bit biting into a workpiece to be processed. That is, the overcurrent flowing during use of the power tool 200 is shut off.

Figure 4:
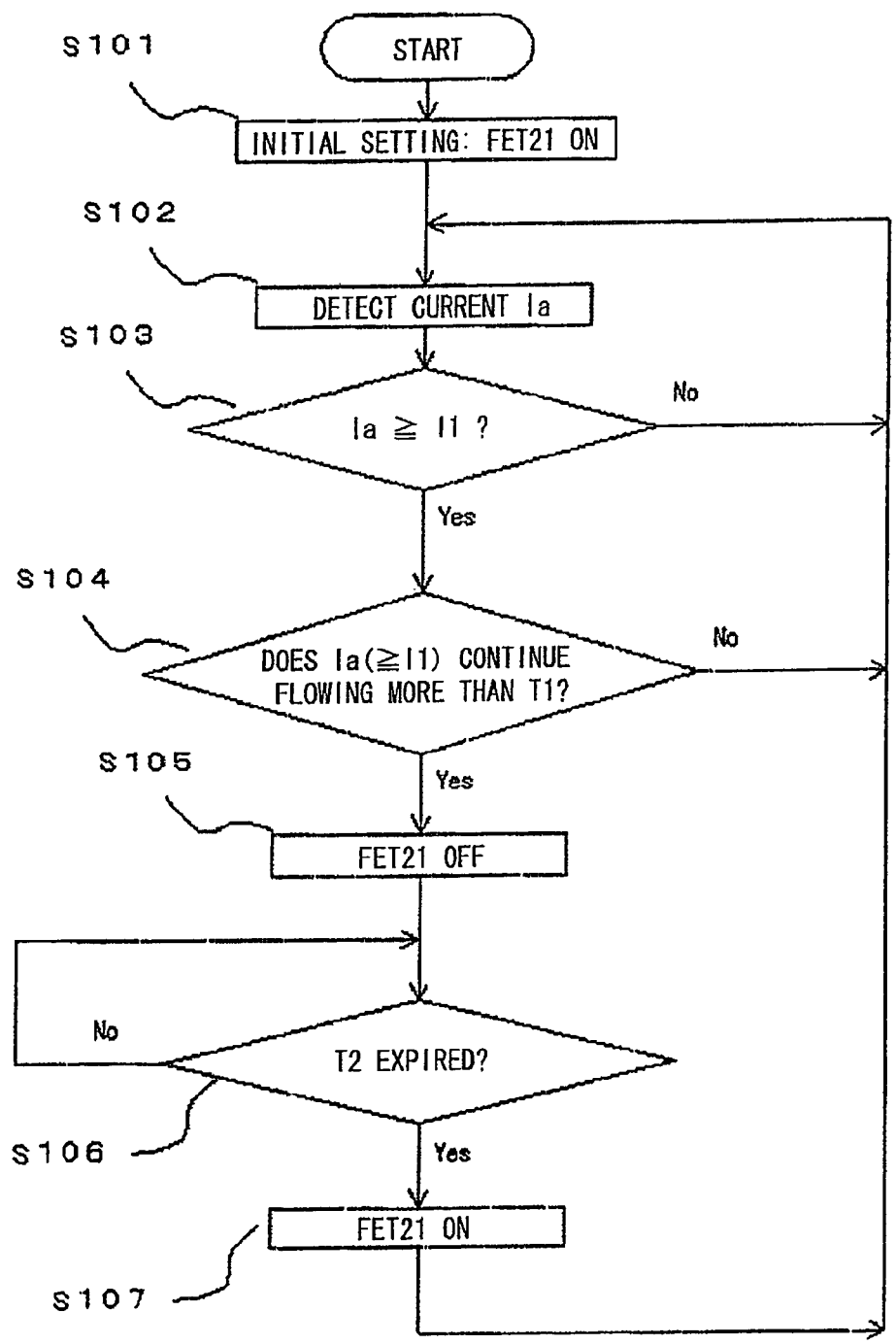
FIG. 4 is a flowchart showing a control flow of the overcurrent protection circuit in the power tool according to the present invention.

In an embodiment shown in FIG. 4, a time period during which an overcurrent flows is measured using a timer, and the FET 21 is maintained ON when the time period thus measured is equal to or less than a predetermined value, while the FET 21 is rendered OFF when the time period measured by the timer goes beyond the predetermined value. A program to carry out the following control is stored in the ROM 62 of the microcomputer 60, and the CPU 61 reads out and executes the program as needed.

As shown in FIG. 4, in step S101, the microcomputer 60 turns on the FET 21 (initial setting) Then, when the main switch 220 of the power tool 200 is switched on, a start-up current flows in the DC motor 210 of the power tool 200.

Figure 5:
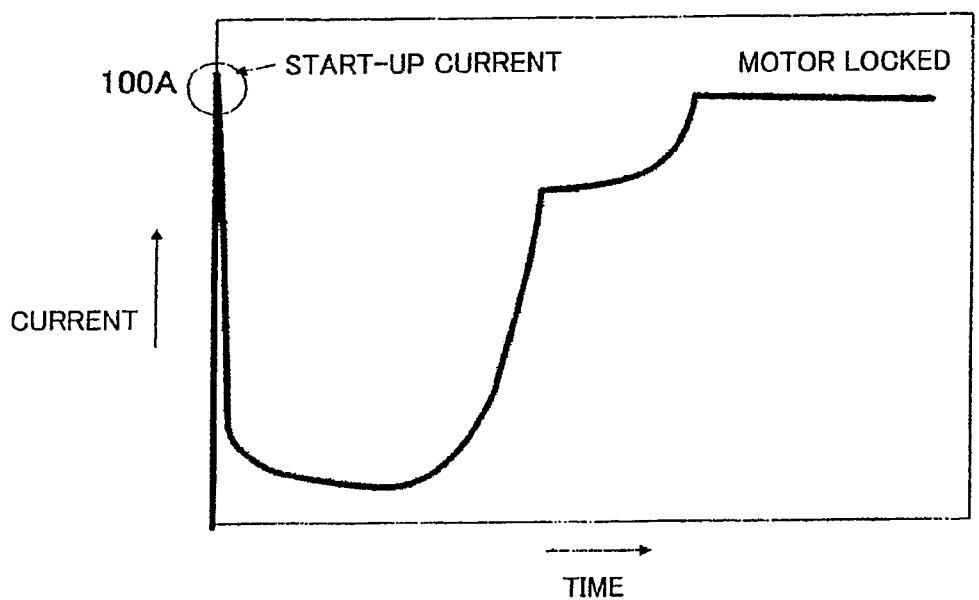
FIG. 5 shows a graphical representation showing a current flowing in a motor from when the same starts rotating until when the same is locked.

In step S102, the current detection section 70 detects a current Ia flowing in the FET 21, and in step S103, the microcomputer 60 judges whether or not the thus detected current Ia is equal to or greater than a predetermined value I1. The predetermined value I1 is properly selected in view of the characteristics between current and cycle life of the lithium battery cells 11 to 14 and the value of a current flowing in an armature winding when the DC motor 210 is in the locked state. For example, as shown in FIG. 5, in case the peak current at the start-up time of the motor is 100 A, the predetermined value I1 is set to 50% through 70% of the peak current.

When the determination made in step S103 is NO, then the FET 21 is maintained at an ON state. On the other hand, when the determination made in step S103 is YES, the routine advances to the next step S104 where determination is made as to whether or not the time period during which a current equal to or greater than the predetermined value I1 flows continues for a time period equal to or more than a predetermined time period T1. To this end, the timer 64 in the microcomputer 60 counts a time period during which the current Ia detected by the current detection section 70 is equal to or more than the predetermined value I1.

Depending on the kind of the DC motor 210, the time period during which an overcurrent flows at the start-up time is 100 msec or less. On the other hand, the time period during which an overcurrent flows when the bit of a power tool 200 bites into a workpiece and the motor 210 comes into the locked state is much longer than 100 msec. Therefore, when the predetermined time period T1 is set to approximately 100 msec, an overcurrent flowing at the start-up time of the motor 210 and an overcurrent flowing when the motor 210 comes into the locked state can be discriminated.

In step S104, when determination is made so that the time period during which an overcurrent flows continues for a time period equal to or more than the predetermined time period T1, then the routine advances to step S105 where the FET 21 is rendered OFF. As a result, an overcurrent is prevented from continuously flowing in the battery 10 composed of the lithium battery cells 11 to 14 for a long time, which can prevent the property deterioration of the lithium battery cells 11 to 14.

Furthermore, in step S106, after the FET 21 is turned OFF, whether or not a predetermined time period T2 has expired is determined. When the determination made in step S106 is NO, the FET 21 is maintained at the OFF state. On the other hand, when the determination made in step S106 is YES, then the routine advances to the next step S107 where the FET 21 is turned ON, whereupon the routine returns to step S102 and the same operations are repeated. The predetermined time period T2 is, for example, set to 5 seconds. Accordingly, even if the DC motor 210 is locked and the FET 21 is turned OFF, the FET 21 is turned ON again after expiration of the predetermined time period T2, thereby allowing an operation voltage to be applied to the DC motor 210. Since the use of the power tool 200 is suspended during the predetermined time period T2, the predetermined time period T2 is properly selected in view of the operationality of the power tool 200 and the deterioration characteristics of the lithium battery cells.

While the control flow of the power tool 200 according to the embodiment of the present invention has been described, the invention is not limited to the embodiment, but various modifications, alternative constructions or equivalents, and also variations of the control can be implemented without departing from the scope of the present invention.

What is claimed is:

1. A power tool comprising:
   a battery comprised of a plurality of lithium battery cells connected in series;
   a DC motor connected to the battery and supplied with a driving current from the battery; and
   means for permitting an overcurrent defined by a current having a value equal to or greater than a predetermined value to flow during a start-up period of the motor and for prohibiting the overcurrent to flow in the current path when the motor is brought into a locked state of operation.

2. The power tool according to claim 1, further comprising:
   a switching element connected between the battery and the motor, wherein the battery, the switching element and the DC motor are connected to provide a current path and the DC motor is supplied with a driving current from the battery through the current path;
   a current detection section that detects a current flowing in the current path and outputs a detection signal indicative of the current flowing in the current path; and
   a controller that receives the detection signal from the current detection section and controls the switching element, wherein the controller shuts off a current flowing in the battery when the detection signal indicates that an overcurrent flows in the battery for a predetermined time period, the overcurrent being defined by a current having a value equal to or more than a predetermined value.

3. The power tool comprising:
   a battery comprised of a plurality of lithium battery cells connected in series; and
   a DC motor connected to the battery and supplied with a driving current from the battery,
   wherein an overcurrent defined by a current having a value equal to or greater than a predetermined value is prohibited to flow in the current path for more than a predetermined time period, further comprising:
   a switching element selectively rendered ON and OFF, wherein the battery, the switching element and the DC motor are connected to provide a current path and the DC motor is supplied with a driving current from the battery through the current path;
   a current detection section that detects a current flowing in the current path and outputs a detection signal indicative of the current flowing in the current path; and
   a microcomputer that receives the detection signal from the current detection section and controls the switching element, wherein the microcomputer has a control program that executes a first step wherein determination is made as to whether or not the value of a current flowing in the current path has exceeded a predetermined value, a second step wherein determination is made as to whether or not the current continuously flows in the current path for a first predetermined time period when the value of the current has exceeded the predetermined value, and a third step of generating a control signal to set the switching element in the off state when the current continuously flows in the current path for the first predetermined time period.

4. The power tool according to claim 3, wherein the control program of the microcomputer further executes after execution of the third step, a fourth step wherein determination is made as to whether or not a second predetermined time period has expired after the switching element is set in the OFF state, and a control signal is generated to set the switching element in the ON state again when the second predetermined time period has expired.

5. The power tool comprising:
   a battery comprised of a plurality of lithium battery cells connected in series; and
   a DC motor connected to the battery and supplied with a driving current from the battery,
   wherein an overcurrent defined by a current having a value equal to or greater than a predetermined value is prohibited to flow in the current path for more than a predetermined time period, further comprising:
   a bit;
   a speed reduction mechanism having an input side operatively coupled to the motor and an output side operatively coupled to the bit, a rotational speed transmitted by the speed reduction mechanism to the bit being reduced relative to a rotational speed of the motor;
   a main body that houses the DC motor and the speed reduction mechanism;
   a handle having one side coupled to the main body; and
   a battery pack that is attached to another side of the handle, the battery pack housing therein the battery.

6. The power tool according to claim 2, wherein when the current detection section detects a starting current of the DC motor, the switching element is set in the on state, whereas the switching element is set in the off state when the current detection section detects a lock current of the DC motor.

7. The power tool according to claim 3, wherein when the current detection section detects a starting current of the DC motor, the switching element is set in the on state, whereas the switching element is set in the off state when the current detection section detects a lock current of the DC motor.

8. The power tool according to claim 2, wherein the switching element comprises a field-effect transistor.

9. The power tool according to claim 3, wherein the switching element comprises a field-effect transistor.

10. A battery pack for use in a power tool including a motor, comprising:
    a battery comprised of a plurality of lithium battery cells connected in series;
    a pair of connection terminals for connection to the power tool; and
    means for permitting an overcurrent defined by a current having a value equal to or greater than a predetermined value to flow during a startup period of the motor and for prohibiting the overcurrent to flow from the battery to the motor when the motor is brought into a locked state of operation.

11. The battery pack according to claim 10, further comprising:
    a switching element;
    a current detection section that detects a current flowing from the battery to the motor and outputs a detection signal indicative of the current flowing from the battery to the motor; and
    a controller that receives the detection signal from the current detection section and controls the switching element, wherein the controller shuts off a current flowing from the battery when the detection signal indicates that an overcurrent flows in the battery for a predetermined time period, the overcurrent being defined by a current having a value equal to or more than a predetermined value.

12. The battery pack for use in a power tool including a motor, comprising:
- a battery comprised of a plurality of lithium battery cells connected in series; and
- a pair of connection terminals for connection to the power tool;
- wherein an overcurrent defined by a current having a value equal to or greater than a predetermined value is prohibited to flow from the battery to the motor for more than a predetermined time period, further comprising:
- a switching element selectively rendered ON and OFF, wherein in use, the DC motor is supplied with a driving current from the battery via the pair of connection terminals;
- a current detection section that detects a current flowing from the battery to the motor and outputs a detection signal indicative of the current flowing from the battery to the motor; and
- a microcomputer that receives the detection signal from the current detection section and controls the switching element, wherein the microcomputer has a control program that executes a first step wherein determination is made as to whether or not the value of a current flowing in the current path has exceeded a predetermined value, a second step wherein determination is made as to whether or not the current continuously flows in the current path for a first predetermined time period when the value of the current has exceeded the predetermined value, and a third step of generating a control signal to set the switching element in the off state when the current continuously flows in the current path for the first predetermined time period.

13. The battery pack according to claim 12, wherein the control program of the microcomputer further executes after execution of the third step, a fourth step wherein determination is made as to whether or not a second predetermined time period has expired after the switching element is set in the OFF state, and a control signal is generated to set the switching element in the ON state again when the second predetermined time period has expired.

14. The battery pack according to claim 11, wherein when the current detection section detects a starting current of the DC motor, the switching element is set in the on state, whereas the switching element is set in the off state when the current detection section detects a lock current of the DC motor.

15. The battery pack according to claim 12, wherein when the current detection section detects a starting current of the DC motor, the switching element is set in the on state, whereas the switching element is set in the off state when the current detection section detects a lock current of the DC motor.

16. The battery pack according to claim 11, wherein the switching element comprises a field-effect transistor.

17. The battery pack according to claim 12, wherein the switching element comprises a field-effect transistor.

* * * * *